United States Patent
Novak et al.

(10) Patent No.: US 9,734,158 B2
(45) Date of Patent: Aug. 15, 2017

(54) SEARCHING AND PLACEHOLDERS

(71) Applicant: Microsoft Technology Licensing, LLC, Redmond, WA (US)

(72) Inventors: Michael John Novak, Redmond, WA (US); Chris Guzak, Kirkland, WA (US); Sangeeta Ranjit, Newcastle, WA (US); Scott David Hoogerwerf, Seattle, WA (US); Amnon Itamar Govrin, Issaquah, WA (US); Marc Wautier, Seattle, WA (US); Kiernon Reiniger, Snohomish, WA (US); Kyle Thomas Beck, Redmond, WA (US); Relja Ivanovic, Seattle, WA (US); Oded Yehuda Shekel, Seattle, WA (US); Tyler Kien Beam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/968,896

(22) Filed: Dec. 15, 2015

(65) Prior Publication Data

US 2016/0188626 A1    Jun. 30, 2016

Related U.S. Application Data

(63) Continuation of application No. 13/873,264, filed on Apr. 30, 2013, now Pat. No. 9,218,350.

(51) Int. Cl.
*G06F 17/30* (2006.01)

(52) U.S. Cl.
CPC .. *G06F 17/30174* (2013.01); *G06F 17/30106* (2013.01); *G06F 17/30117* (2013.01); *G06F 17/30153* (2013.01)

(58) Field of Classification Search
None
See application file for complete search history.

(56) References Cited

U.S. PATENT DOCUMENTS

| | | | |
|---|---|---|---|
| 5,721,916 A | 2/1998 | Pardikar | |
| 5,978,815 A * | 11/1999 | Cabrera | G06F 3/0626 |
| 7,603,397 B1 | 10/2009 | Hagerstrom et al. | |

(Continued)

FOREIGN PATENT DOCUMENTS

| | | |
|---|---|---|
| WO | 9523376 A1 | 8/1995 |
| WO | 2008095237 A1 | 8/2008 |
| WO | 2013036920 A1 | 3/2013 |

OTHER PUBLICATIONS

"Non-Final Office Action Issued in U.S. Appl. No. 13/873,264", Mailed Date: Apr. 9, 2015, 30 Pages.
"Notice of Allowance Issued in U.S. Appl. No. 13/873,264", Mailed Date: Aug. 14, 2015, 8 Pages.
Novak, John Michael "File Management With Placeholders", U.S. Appl. No. 13/873,241, filed Apr. 30. 2013, 60 pages.
Novak, John Michael "Hydration and Dehydration With Placeholders", U.S. Appl. No. 13/874,474, filed Apr. 30, 2013, 55 pages.

(Continued)

*Primary Examiner* — Jay Morrison

(57) ABSTRACT

Aspects of the subject matter described herein relate to file system placeholders. In aspects, placeholders may be used by a client to represent remote file system objects. The placeholders may include metadata, searchable text, and may also include none, some, or all of the content of the represented remote file system objects. Search data from the placeholders is integrated into a local search database of the client such that the client is able to satisfy queries and identify relevant local and remote file system objects even when the client is offline with respect to remote storage.

20 Claims, 6 Drawing Sheets

(56) References Cited

U.S. PATENT DOCUMENTS

| | | |
|---|---|---|
| 8,331,566 B1 | 12/2012 | Foote et al. |
| 8,417,746 B1 | 4/2013 | Gillett et al. |
| 2004/0019613 A1 | 1/2004 | Jones et al. |
| 2004/0049513 A1 | 3/2004 | Yakir et al. |
| 2005/0198385 A1* | 9/2005 | Aust .............. G06F 17/30233 709/245 |
| 2005/0210119 A1* | 9/2005 | Kumar .............. H04L 12/2805 709/217 |
| 2006/0200570 A1 | 9/2006 | Stirbu et al. |
| 2006/0224993 A1 | 10/2006 | Wong et al. |
| 2008/0010325 A1 | 1/2008 | Yamakawa |
| 2009/0172274 A1 | 7/2009 | Nochimowski et al. |
| 2009/0193107 A1 | 7/2009 | Srinivasan et al. |
| 2010/0325199 A1 | 12/2010 | Park et al. |
| 2012/0110015 A1* | 5/2012 | Nath .............. G06F 17/30693 707/780 |
| 2012/0158891 A1 | 6/2012 | Dooley et al. |
| 2012/0167074 A1 | 6/2012 | Rajpure et al. |
| 2012/0179553 A1 | 7/2012 | Duggal |
| 2012/0215820 A1 | 8/2012 | Ogasawara et al. |
| 2013/0036135 A1 | 2/2013 | Brockey et al. |
| 2014/0250069 A1* | 9/2014 | Lakshminarayanan .............. G06F 17/30575 707/634 |

OTHER PUBLICATIONS

Novak, John Michael "Streaming Content and Placeholders", U.S. Appl. No. 13/874,488, filed May 1, 2013, 69 Pages.

"International Search Report & Written Opinion Issued in PCT Application No. PCT/US2013/060250", Mailed Date: Jan. 2, 2014, 9 Pages.

"International Preliminary Report on Patentability Issued in PCT Application No. PCT/US2013/061056", Mailed Date: Nov. 12, 2015, 6 Pages.

"International Search Report & Written Opinion Issued in PCT Application No. PCT/US2013/061056", Mailed Date: Jan. 2, 2014, 9 Pages.

"International Search Report & Written Opinion Issued in PCT Application No. PCT/US2013/061071", Mailed Date: Jan. 2, 2014, 10 Pages.

"International Search Report & Written Opinion Issued in PCT Application No. PCT/US2013/061072", Mailed Date: Feb. 21, 2014, 11 Pages.

Marino, et al., "A Virtual File System for the Coordinated Management of Geographically Dispersed Archives", In Conference of Australian Open System Users Group, Sep. 25, 1991, 9 Pages.

"Basic Concepts", Retrieved From <<https://technet.microsoft.com/en-us/library/cc938459.aspx>>, Mar. 6, 2013, 3 Pages.

* cited by examiner

SEARCHING AND PLACEHOLDERS

RELATED APPLICATIONS

This application is a continuation patent application of copending application with Ser. No. 13/873,264, filed Apr. 30, 2013, entitled "SEARCHING AND PLACEHOLDERS", which is now allowed. The aforementioned application(s) are hereby incorporated herein by reference.

BACKGROUND

Today, it is not uncommon for a family or even a single person to have multiple computing devices such as a desktop computer, a laptop, a smartphone, an internet-enabled television, a set top box, a gaming device, a reading tablet, and so forth. In addition, a user may have thousands of files that include pictures, audio, documents, and the like that are stored in the cloud or elsewhere. A user may want to access the files from one or more of the computing devices available to the user.

Downloading all of the user's content to each of the user's devices may not be possible as some devices may have very limited storage. Furthermore, even when a computing device has extensive storage, downloading the content to the computing device may consume considerable bandwidth, be costly, and take a long time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to file system placeholders. In aspects, placeholders may be used by a client to represent remote file system objects. The placeholders may include metadata, searchable text, and may also include none, some, or all of the content of the represented remote file system objects. Search data from the placeholders is integrated into a local search database of the client such that the client is able to satisfy queries and identify relevant local and remote file system objects even when the client is offline with respect to remote storage.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
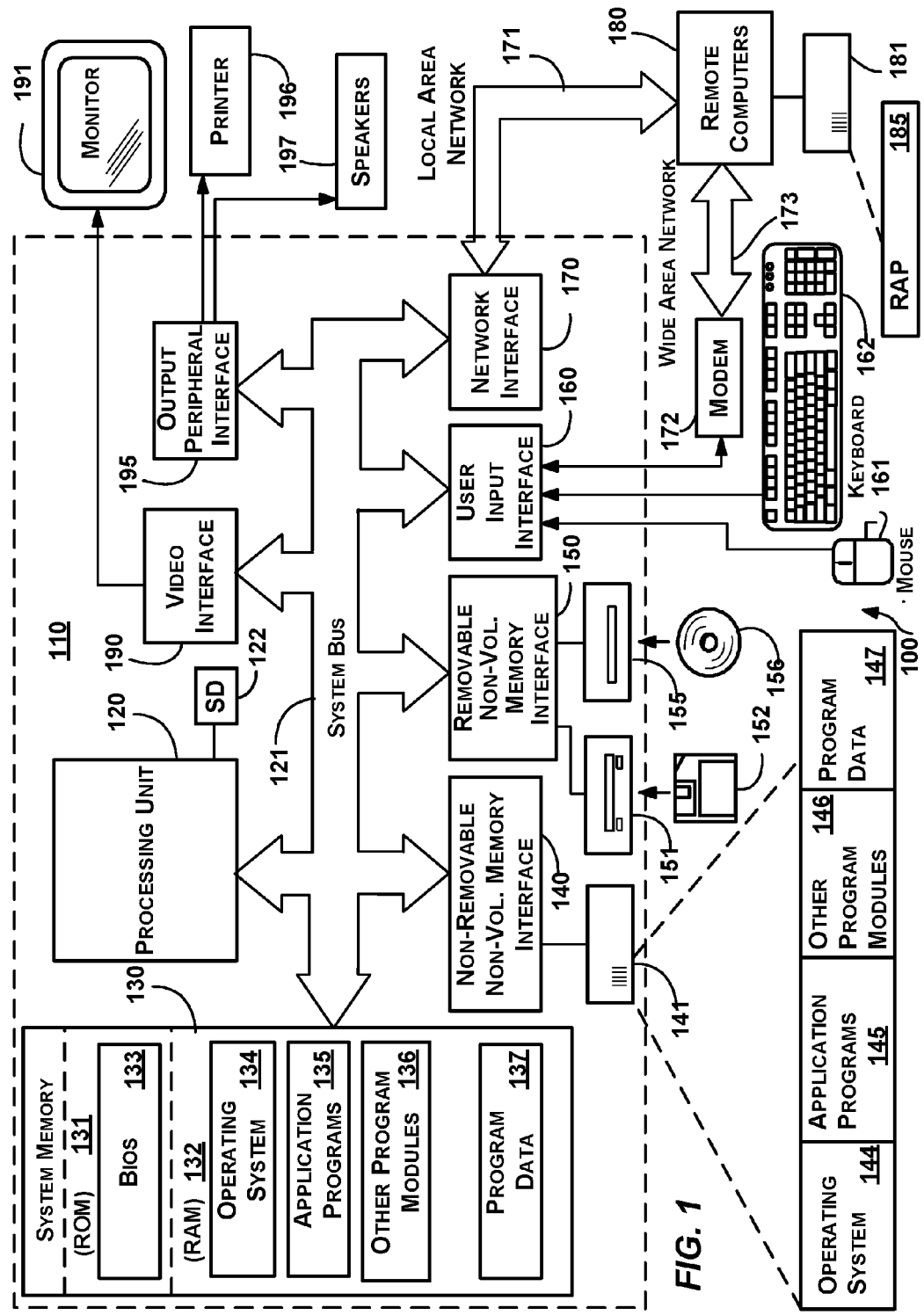
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Placeholders

In accordance with an aspect of the subject matter described herein, placeholders may be used. A placeholder may include a data structure that represents a file system object. A file system object may be a file or a directory. A directory may include zero or more files and may be a traditional file directory or some other collection or container of files. For simplicity, the term file is often used herein, but it is to be understood that the teachings herein may also be applied to directories without departing from the spirit or scope of aspects of the subject matter described herein.

A placeholder may be stored on a local storage device of a machine. In one implementation, a placeholder may indicate that content associated with the placeholder is available in a place other than a file system of the machine (hereinafter sometimes referred to as a local file system or a client file system). For example, a placeholder may indicate that content associated with the placeholder is stored in one of the cloud storage systems illustrated in FIG. 3.

In another implementation, a placeholder may indicate that the content is accessible through an application that resides on the machine. This application may store the content in memory, a local file system or a remote file system, may generate the content, may perform a combination of the above, or the like. Even if the file system could obtain the content directly, the file system may still rely on the application to access the content of the file.

In one implementation, for a placeholder where the associated content is relatively small (e.g., less than a predetermined, configurable, or calculated threshold), a copy of the entire content associated with the placeholder may also be stored in the placeholder. Storing data "in the placeholder" is meant to include storing the data in the data structure of the placeholder and/or storing the data in a local storage location indicated by the placeholder.

Depending on implementation, a placeholder may include various levels of details about a file. At a minimum, a placeholder includes data that identifies a file in a remote storage system. For example, a placeholder may indicate a specific cloud storage system at which the content may be found together with information (e.g., an identifier) that identifies the file to the cloud storage system.

A placeholder may include extrinsic metadata and/or intrinsic metadata of a file. Extrinsic metadata is any metadata that is stored outside of the content of the file. For example, extrinsic metadata may include name, size, date modified, date created, date last accessed, attributes of the file, version, other metadata maintained by the file system, and the like.

Intrinsic metadata is any metadata that is stored inside the content of the file. For example, for an audio file, intrinsic metadata may include artist name, album name, year, title of song, rating, tags, comments, genre, length, bit rate, and the like. For an image such as a camera picture, intrinsic metadata may include, for example, author, date taken, acquiring program name, dimensions, resolution, bit depth, compression, camera maker, camera model, f-stop, exposure time, other information, and the like.

The examples of intrinsic and extrinsic metadata described above are not intended to be all-inclusive or exhaustive of the types of intrinsic and extrinsic metadata.

Indeed, based on the teachings herein, those skilled in the art will readily recognize other extrinsic and intrinsic metadata that may be used in accordance with the teachings herein without departing from the spirit or scope of aspects of the subject matter described herein.

In one implementation, a placeholder may include extrinsic metadata of a file such as name of the file, a size of the file, a date that the file was modified, and a date that the file was created. In another implementation, in addition to the above, a placeholder may also include attributes of the file.

In another implementation, a placeholder may include some or all of the intrinsic metadata of a file.

In one implementation, a placeholder may include some or all of the searchable text of a file. For example, a word processing document may have content that includes text and formatting. A placeholder may include the beginning N characters, words, paragraphs, pages, or the like of the text of the word processing document without the formatting, where N is predetermined, configurable, or determined on the fly.

In one implementation, a placeholder may include an indication of the language(s) of the searchable text. For example, a placeholder may include data that indicates that the searchable text is written in English. As another example, a placeholder may include data (e.g., a tag or other data) that indicates that a portion of the text is written in English and data (e.g., another tag or other data) that indicates that another portion of the text is written in Spanish.

As another example, a presentation program may have relatively little text compared to other data used for a presentation. In this example, a placeholder may include all the text of the presentation while omitting other data used for the presentation.

In one implementation, a placeholder may include a thumbnail of an image. The image may be included in the content of the file associated with the placeholder while the thumbnail may be generated from the image or also included in the content of the file. In one embodiment, the thumbnail included in the placeholder may be of a relatively small size that may be predefined, configurable, or determined on the fly.

In one implementation, a placeholder may include data that identifies how to obtain larger thumbnails of the content associated with the placeholder. For example, a placeholder may include an address of a service from which a larger thumbnail of a file may be requested. The service may be able to accept input that indicates the size of the thumbnail that is to be provided.

Likewise, in one implementation, a placeholder may include a lower fidelity sample (or data that identifies how to obtain such as sample) of content of a file associated with the placeholder. For example, a placeholder may include a lower fidelity sample (or link to a service) of a music, video, or other type of file.

In one implementation, a placeholder may include a data structure (e.g., a bitmap, linked list, or other data structure) that indicates which portions of the associated content are located on the local file system. This data structure may be consulted when a program seeks to access the content. If the data structure indicates that the requested content is available locally, the requested content may be obtained from local storage. If not, other actions may be taken to obtain the requested content from remote storage prior to providing the program with the content.

In one implementation, a placeholder may have a flag that indicates whether the content of the file is to be made available when offline. As indicated previously, a client may periodically lose connectivity to remote storage upon which content associated with a placeholder is found. If the flag is set, when the client is online, content for the placeholder may be downloaded to local storage and be maintained there so that the content is available even when the remote storage is unavailable.

Various embodiments may have placeholders that include any one or more of the data indicated above.

A placeholder may be used to give the illusion that a file resides on a local file system even when the content of the file resides remotely. This illusion may be maintained even when the remote file system is not reachable. This may be done by inserting the placeholder into a namespace of a local file system. The file system may be modified to recognize placeholders and to display information about a file represented by the placeholder as appropriate. For example, the file system may display the names and relevant metadata for a placeholder when a user navigates through the namespace of the local file system.

Placeholders may be used to vastly reduce the amount of storage space consumed. For example, instead of storing the content for large videos locally, placeholders may be used to indicate that the videos are available. Because the placeholders may use a much smaller amount of space than the actual content of the video, even a relatively small local storage device may include placeholders for a vast collection of files that include a significant amount of content.

Placeholders may be used when a remote storage system is unavailable. For example, when network connectivity is lost or not available, a machine may use locally stored placeholders to navigate and perform other operations on the namespace of a file system.

A placeholder is persisted even when the client machine is shutdown. Thus, the placeholder is still available when the client machine is restarted. This persistence behavior may be implemented by storing the placeholder on a local storage of the client.

Figure 2:
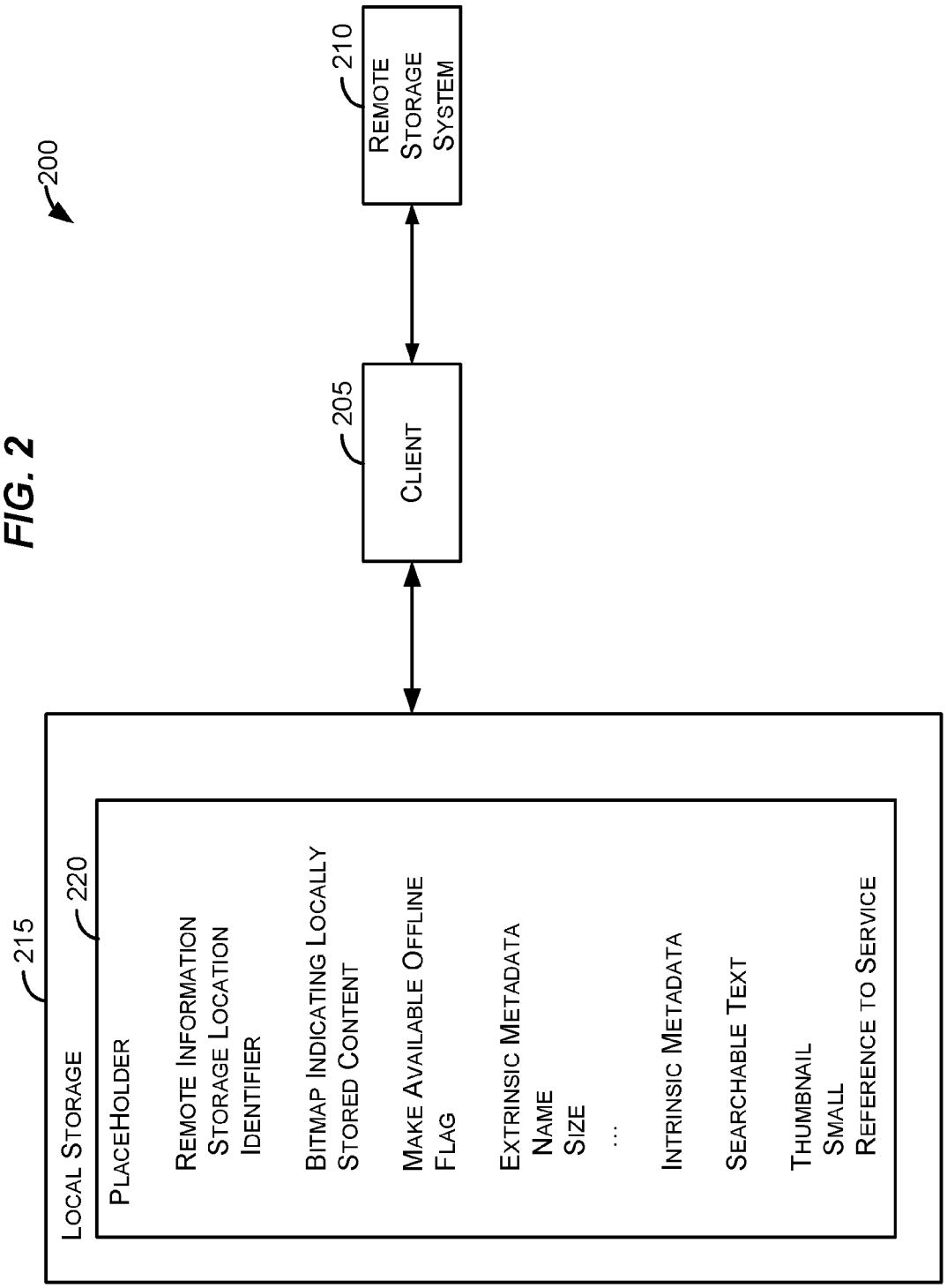
FIGS. 2-3 are block diagrams that generally represent exemplary components of systems configured to use placeholders in accordance with aspects of the subject matter described herein.
Figure 3:
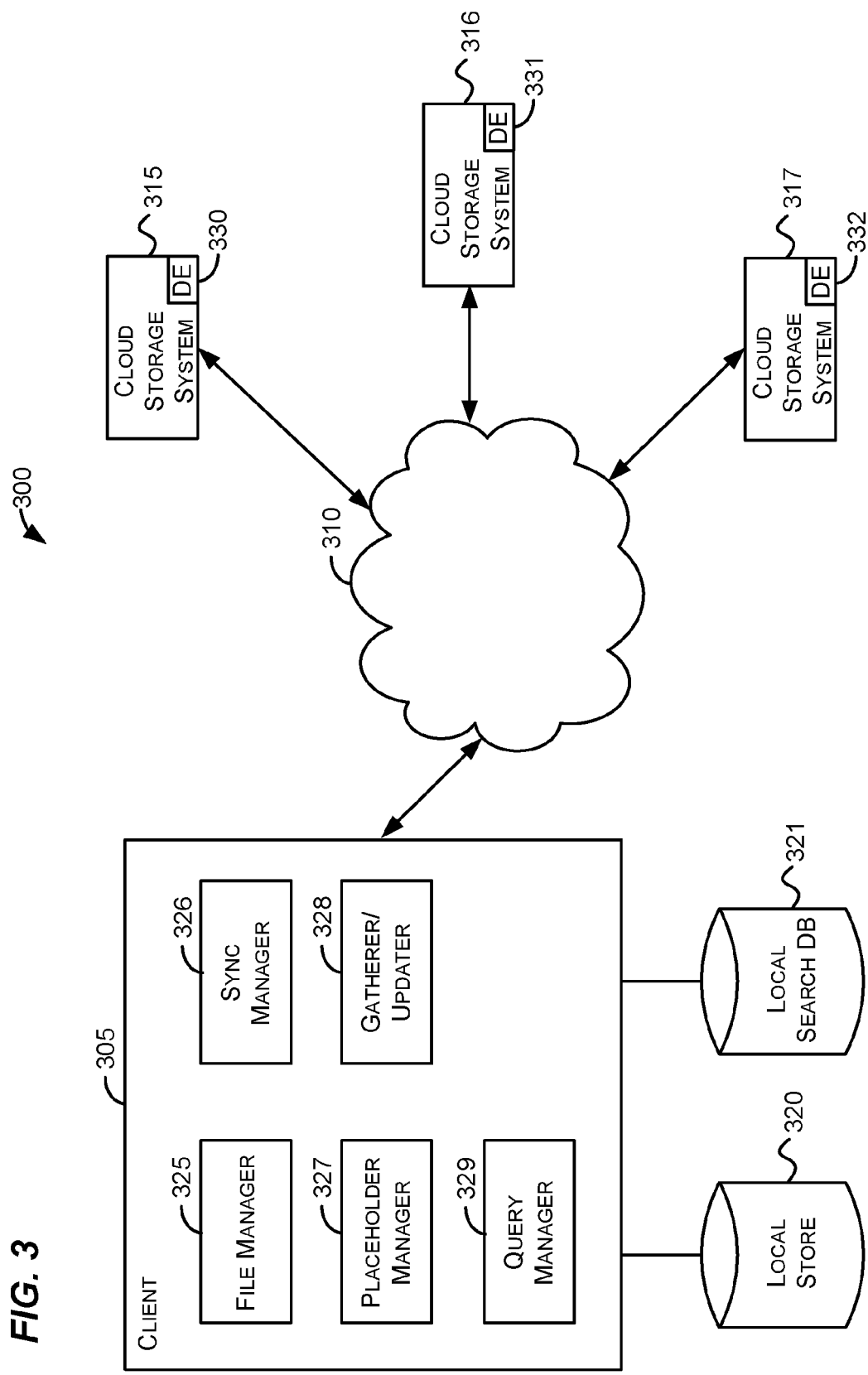

FIGS. 2-3 are block diagrams that generally represent exemplary components of systems configured to use placeholders in accordance with aspects of the subject matter described herein. The components illustrated in FIGS. 2-3 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIGS. 2-3 may be included in other components (shown or not shown) or placed in subcomponents without departing from the spirit or scope of aspects of the subject matter described herein. In some embodiments, the components and/or functions described in conjunction with FIGS. 2-3 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIGS. 2-3 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIGS. 2-3 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Turning to FIG. 2, the system 200 may include a client 205, a remote storage system 210, local storage 215, a placeholder 220, and may include other components (not shown). The client 205 may have direct access to the local storage 215 and be connected to the remote storage system 210 through the use of a cloud network.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The local storage 215 may include any storage media capable of storing data. For example, the local storage 215 may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The local storage 215 may be external, internal, or include some components that are internal and some components that are external to the client 205. In one implementation, the local storage 215 may include any storage that is housed in a machine hosting the client 205. In another implementation, the local storage 215 may include storage that is directly connected to the machine hosting the client 205. For example, the local storage 215 may be connected to the machine via a USB link, an IEEE 1394 link, an optical link, another hard-wired link, or the like.

The remote storage system 210 may include one or more computers that are arranged to store and provide access to data. Access as used herein may include reading data, writing data, deleting data, updating data, a combination including two or more of the above, and the like. The remote storage system 210 may be connected to the client 205 via a network such as the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In one example, the remote storage system 210 may comprise a data center where the computing devices are located in a single physical location. In another example, the remote storage system 210 may include computing devices and storage that are attached to the cloud at different locations. In one example, the remote storage system 210 may comprise a single server or other computing device that provides access to one or more storage devices. In one example, the remote storage system 210 may comprise a computing device that is not on the client 205's local area network (LAN). In another example, the remote storage system 210 may comprise any storage that is not housed in or directly connected to the client 205. In another example, the remote storage system 210 may include storage that is not available to the client 205 when the client is not connected to a network from which the storage is accessible.

Sometimes the term cloud storage system is used herein. This is not intended to be limiting with respect to remote storage systems to which the teachings herein may be applied but to provide an example of a remote storage system that may be used without departing from the spirit or scope of aspects of the subject matter described herein. Whenever the term cloud storage system is used herein, it is to be understood that in other embodiments, other types of remote storage systems may be used without departing from the spirit or scope of aspects of the subject matter described herein.

While the local storage 215 maybe almost continuously available to the client 205 or may be readily made available by means available to the user (e.g., by plugging in a connector) the remote storage system 210 may, at times, become unavailable to the client 205. For example, if the client 205 is hosted on a laptop, the laptop may be moved to a location that does not have Internet access. As another example, network outages may disrupt the connectivity of the client 205 to the remote storage system 210. As another example, the remote storage system 210 may become inoperative or may be shut down or disconnected for maintenance or other purposes. Without placeholders, when connectivity with the remote storage system 210 is lost, the client 205 may not be able to navigate the namespace or perform operations on a file where the entire file content is not available on the local storage 215.

The placeholder 220 illustrates various exemplary data fields that may be stored in a placeholder stored on the local storage 215. Although only one placeholder is shown in FIG. 2, more often, there will be multiple placeholders stored on the local storage 215. For example, for a given namespace, there may be one placeholder for each remote file system object if the content of the remote file system object does not completely exist on the local storage 215. As another example, for the given namespace, there may also be placeholders for remote file system objects even when the entire content of the remote file system objects exists on the local storage 215. This second set of placeholders may also be stored on the local storage 215 for files having content with a size less than a given threshold as mentioned previously.

A namespace may include an identifier (e.g., name or other identifier) for each file of a file system together with hierarchy information regarding the file. For example, a namespace may include a namespace entry corresponding to D:\DIR1\FILE1.TXT. This namespace entry indicates the name of a file (e.g., FILE1.TXT) and indicates that the file exists in a directory (e.g., DIR1). A namespace may also include other metadata. A namespace may have a one-to-one or some other mapping with file system information and may represent virtual folder hierarchies.

Searching

As mentioned previously, there may be various reasons to avoid storing all files of a user on each device of the user. With the use of placeholders, a file may be completely hydrated, partially hydrated, or dehydrated. When an application on a client requests content of a file that does not exist on the client file system, the content may be obtained from a cloud storage system.

To completely hydrate a file, in one implementation, content of the file represented by a placeholder may be downloaded and stored on the client file system. The entire content of a file may be downloaded in a single download or may be streamed to the client 305. Upon being completely hydrated, in one implementation, the placeholder may be purged from the local file system and replaced with regular file system metadata. In another implementation, even though the contents and metadata of a file are stored on the client file system, the placeholder may remain and be used in conjunction with or instead of the regular file system metadata maintained for the file.

When a file is partially hydrated, this indicates that at least a portion of the content of the file represented by a placeholder is stored on the client file system. As indicated earlier, a data structure of the placeholder may indicate which portions of the file are stored on the client file system and which portions of the file are not stored on the client file system. In one implementation, at least as long as a file is partially hydrated, a corresponding placeholder remains on the client file system.

When a file is dehydrated, other than intrinsic metadata, if any, included in the content (and stored in the placeholder), the content of the file is not stored on the client file system.

Turning to FIG. 3, the system 300 may include a client 305, a cloud 310, cloud storage systems 315-317, a file store 320, a search store 321, and other components (not shown). The client 305 may include a file manager 325, a synchronization manager 326, a placeholder manager 327, a gatherer/updater 328, a query manager 329, and other components (not shown).

The components of FIG. 3 may be implemented using the hardware and/or software of one or more computing devices as described previously. In one implementation, the local store 320 and the search store 321 may be implemented by a single file system. In another implementation, the local store 320 and the search store 321 may be implemented by separate file systems. The storage device(s) that implement the local store 320 and the search store 321 may be implemented in a similar manner as the local storage 215 of FIG. 2 and may be external, internal, or include some components that are internal and some components that are external to the client 305.

The local store 320 may have computer storage elements that persist (e.g., put in non-volatile storage) file system metadata for local file system objects of a local file system of the client and that persist placeholders for remote file system objects of a cloud storage system. As mentioned previously, the placeholders may include metadata of the remote file system objects without requiring that content of the remote file system objects exist in the local store 320.

The search store 321 may have computer storage elements that persist a search database that includes search information from the local files and from the placeholders. The search database may comprise a relational database, an object-oriented database, a hierarchical database, a network database, another type of database, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with a particular type of database may sometimes be used herein. Although particular database terminology may be used herein, the teachings herein may also be applied to other types of databases including those that have been mentioned previously.

The metadata included in placeholders stored in the local store 320 may be sufficient to allow the client 305, while offline with respect to a cloud storage system, to obtain namespace information from the placeholders. In one implementation, at a minimum, sufficient metadata may include a name of the file system object. For example, with the name of the file system object and hierarchy information maintained in the file system, a user may navigate a namespace of the client file system even when the client is offline with respect to a cloud storage system. In other implementations, the metadata included in the placeholders may also include other metadata, intrinsic or extrinsic, of file system objects.

The file manager 325 may be structured to create, via the file system metadata and the placeholders, a namespace that includes the local file system objects and the remote file system objects. The file manager 325 may be further structured to provide, via an interface, metadata for the local file system objects and the remote file system objects regardless of whether connectivity exists to a cloud storage system.

In absence of connectivity to a cloud storage system, the file manager 325 may still allow operations to proceed on both files that reside locally and files represented by placeholders. For example, the file manager may update a file system data structure of the local file system to indicate an operation performed on a file system object represented by a placeholder even when the content of the file system object does not reside completely on the local store. As another example, the file manager 325 may update a namespace to reflect an operation such as a rename, move, delete, restore, create, copy operation, or the like.

The synchronization manager 326 may be structured (e.g., include hardware and/or software) to discover changes (e.g., content changes, metadata changes including intrinsic, extrinsic, and namespace changes, other changes, and the like) that occurred to file system objects in the absence of connectivity to the cloud storage system and, when connectivity is re-established with the cloud storage system, to synchronize the changes with the cloud storage system.

In different implementations, the synchronization manager 326 may use various methods for discovering changes. For example, in one implementation, the synchronization manager 326 may discover changes by examining an operations log that stores operations that occur on file system objects. As another example, in another implementation, the synchronization manager 326 may discover changes by comparing a state of file system and file system objects prior to the changes with a state of the file system and file system objects after the changes.

The placeholder manager 327 may be structured to create, populate, and maintain the placeholders to ensure that a placeholder exists for each remote file system object in the namespace at least if the content of the remote file system object does not completely exist on the local store 320. As mentioned previously, a placeholder may also be maintained on the local file system when the content of the remote file system object does completely exist on the local store 320.

The gatherer/updater 328 and/or other components of the client 305 may be structured to gather search data for file system objects and placeholders that exist on the local store and to use the gathered search data to update a database that resides on the search store 321.

The query manager 329 may receive and handle queries using the database that resides on the search store 321.

Some exemplary actions that may be performed by the gatherer/updater 328, the query manager 329, and/or other components of the client 305 include:

1. Receiving metadata for a file system object that is represented by a placeholder. The placeholder is stored on a local file system of the client. The placeholder includes data that identifies a cloud storage system from which content of the file system object is obtainable.

2. Storing the metadata in the placeholder. As mentioned previously, placeholders may be used to store intrinsic and extrinsic metadata of file system objects whose content does not reside on the client file system.

3. Obtaining search data from the metadata. Search data may be identified and obtained from the metadata. In one embodiment, all of the metadata may be used as search data. In another embodiment, some of the metadata (e.g., text, date, and other relevant fields) may be used for search data while the rest of the metadata (e.g., numbers, bitmaps, and the like) may be omitted as search data.

4. Representing the search data in a search database that resides on the local file system of the client. The search data obtained from the metadata may then be represented in the search database. The representation may indicate, for example, that the search data was obtained from a certain file represented by an indicated placeholder.

5. While the client is offline with respect to the cloud storage system, receiving a search request. In response to the search request, the search database of the local file system may be searched. In searching the search database, a file that is represented by a placeholder may be identified as being relevant to the search request. An indication (e.g., a name or other identifier and perhaps other metadata about the file) may be provided as an indication of the file.

The client may be offline with respect to multiple cloud storage systems that store content for placeholders that reside on the client file system. In this condition, the client may receive a search request and search the search database for relevant files. Using the search database, the client may find at least one file that resides completely on the client file system while finding two or more files for which content is available on different ones of the cloud storage systems. The client may then display an indication of each relevant file (the ones that are available locally and the ones that are represented by placeholders) together in a single graphical interface.

Along these lines, while the client is offline with respect to a cloud storage system, the client may receive a search request that asks for files that have at least metadata that satisfies conditions indicated by the search request. From the search database of the client, the client may obtain data that indicates all files that satisfy the conditions. The files may include files that reside on the local file system and files that reside in the cloud storage system and that are represented by placeholders that are stored on the local file system. The data for all the files may be provided in a single result set that does not distinguish between files that reside locally and files that are represented by placeholders.

As one example of the above, a client may receive a search request that asks for a timeline view of all photos taken over a period of time. In response, from the search database, the client may obtain data that indicates all files that satisfy these conditions. Some of these files may have content that completely resides on the local file system while the content for others of these files (e.g., files represented by placeholders) may not completely reside on the local file system. For the former files, timeline data may be obtained from file system metadata maintained on the local file system. For the latter files, timeline data may be obtained from the placeholders. An ordered timeline (e.g., a sequence from most recent to least recent or vice versa) of all the found files may be displayed in a single interface that does not distinguish between files that reside locally and files that are represented by placeholders.

Based on the teachings herein, those skilled in the art will recognize many other query applications of the techniques described herein that may be practiced without departing from the spirit or scope of aspects of the subject matter described herein.

6. Deleting content for a file from a local file system and replacing the file with a placeholder that indicates that the content is still available on a cloud storage system. When the content of the file is deleted, the client may refrain from deleting from the search database search data that was obtained from the file provided that the placeholder still exists on the local file system. While the client is offline, the client may receive a search request. In searching the search database, the client may identify the file as having data relevant to the search request.

7. In addition to, or in lieu of receiving metadata, receiving searchable text for a file. The searchable text may also be stored in the placeholder. Search data (e.g., words, phrases, numbers, other text, and the like), may be obtained from the searchable text and stored in the search database that is stored on the client storage system.

In one implementation, the searchable text may form only a portion of all the searchable text of the file. For example, in a word processing document, the searchable text may include the first N pages where N is configurable. In another implementation, the searchable text may include all of the searchable text of the file.

The searchable text may be extracted from the file by a sender (e.g., a process that executes on the cloud storage system) of the searchable text. For example, the data extractors 330-332 may extract metadata and searchable text from stored files and provide this data to the client 305.

8. Hydrating a file and obtaining additional search data. In conjunction to hydrating a file, a client may receive a request for content of the file. The client may obtain the content from a cloud storage system and delete the placeholder. With the entire content of the file available locally, the client may extract additional search data from the content of the file and may represent the additional search data in the search database.

The cloud storage systems 315-317 may include one or more storage devices together with one or more computing devices that provide access to those storage devices. In one embodiment, a cloud storage system may comprise a data center where the computing devices are located in a single physical location. In another embodiment, a cloud storage system may include computing devices and storage that are attached to the cloud at different locations. In one embodiment, a cloud storage system may comprise a single server that provides access to one or more storage devices. In one embodiment, a cloud storage system may comprise a computing device that is not on the client's local area network (LAN). In another embodiment, a cloud storage system may comprise any storage that is not housed in or directly connected to the client.

Although three cloud storage systems are shown in FIG. 2, in other implementations, there may be any number of cloud storage systems.

Figure 4:
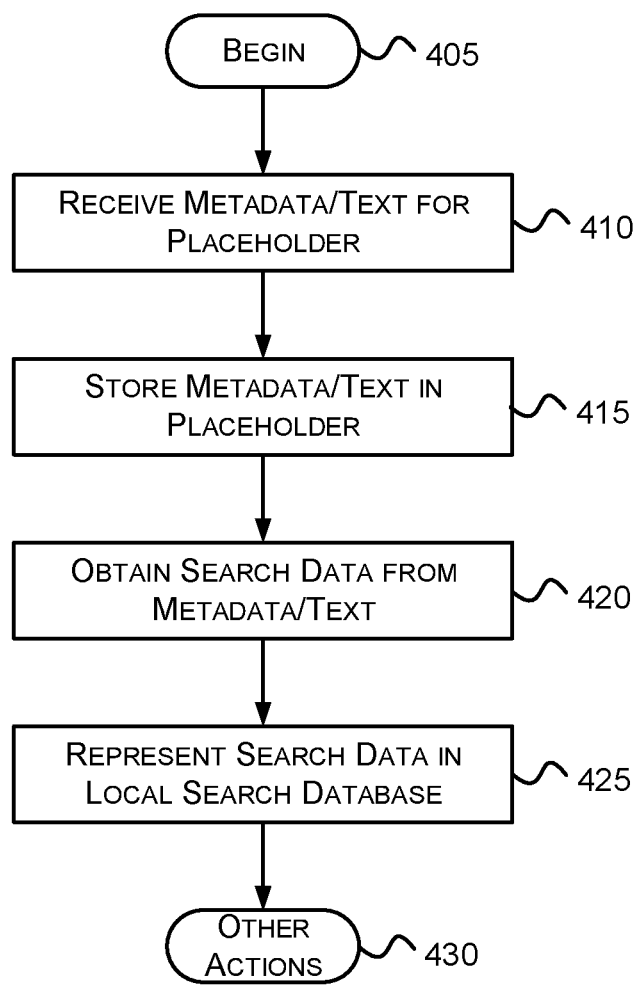
FIGS. 4-5 are flow diagrams that generally represent exemplary actions that may occur from a client perspective in accordance with aspects of the subject matter described herein.
Figure 5:
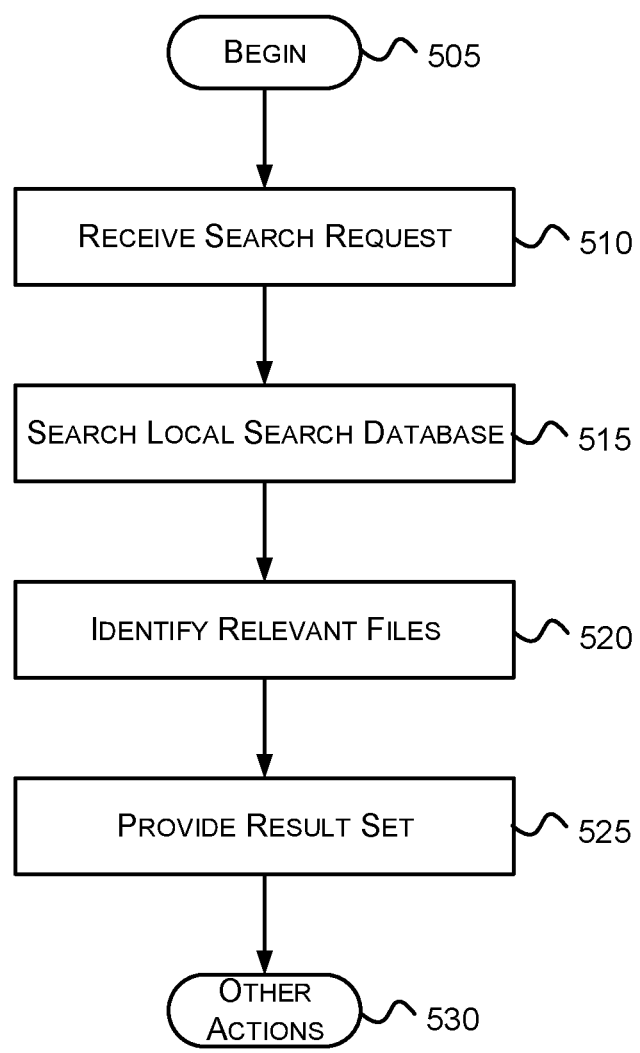
Figure 6:
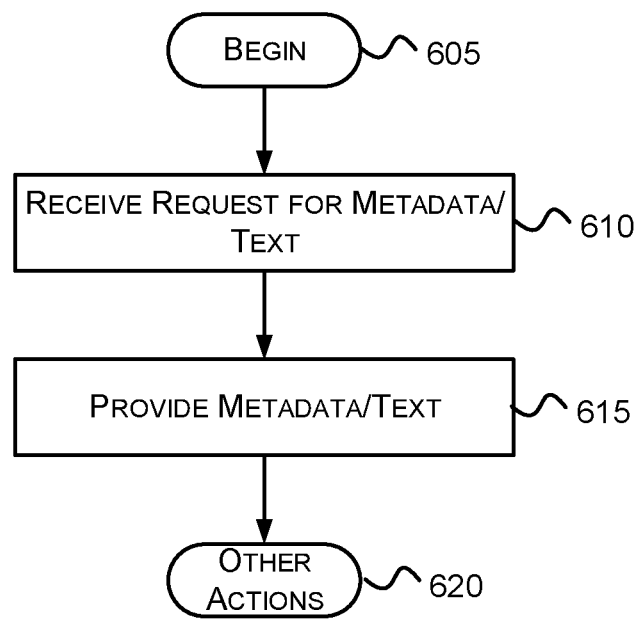
FIG. 6 is a flow diagram that generally represents exemplary actions that may occur from a cloud storage system perspective in accordance with aspects of the subject matter described herein.

FIGS. 4-6 are flow diagrams that generally represent exemplary actions that may occur in accordance with aspects of the subject matter described herein. For simplicity of explanation, the methodology described in conjunction with FIGS. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIGS. 4-5 are flow diagrams that generally represent exemplary actions that may occur from a client perspective in accordance with aspects of the subject matter described herein. Turning to FIG. 4, at block 405, the actions begin.

At block 410, metadata and/or searchable text is received for a file that is represented by a placeholder. For example, referring to FIG. 3, the client 305 may receive metadata for a file that is represented by a placeholder where the placeholder is stored in the local store 320.

At block 415, the metadata and/or searchable text is stored in the placeholder. For example, referring to FIG. 3, the client 305 may store the received metadata and/or searchable text in the placeholder that represents the file.

At block 420, the metadata and/or searchable text is obtained. For example, referring to FIG. 3, in one implementation, the gatherer/updater 328 may obtain the metadata and/or searchable text from the placeholder of the local store 320. In another implementation, the gatherer/updater 328 may obtain the metadata and/or searchable text when the client 305 receives it from the cloud storage system.

At block 425, the search data is represented in the local search database. For example, referring to FIG. 3, the client may represent the search data in the search store 321.

At block 430, other actions, if any, may be performed. The other actions may include, for example, the actions mentioned in conjunction with FIG. 3 or other actions described herein.

Turning to FIG. 5, at block 505, the actions begin. At block 510, a search request is received. For example, referring to FIG. 3, the query manager 329 may receive a search request from an application (not shown).

At block 515, in response to the search request, a local search database is searched. For example, referring to FIG. 3, the query manager 329 searches a search database stored on the search store 321.

At block 520, relevant files are identified. For example, referring to FIG. 3, the query manager 329 may identify files that have content that is stored on the local store 320 and files that have content that is not stored on the local store 320.

At block 525, a result set is provided that includes all relevant files identified. For example, referring to FIG. 3, the query manager 329 may provide a result set that includes files stored on the local store 320 and files that are represented by placeholders where the content is not stored on the local store 320.

At block 530, other actions, if any, may be performed.

FIG. 6 is a flow diagram that generally represents exemplary actions that may occur from a cloud storage system perspective in accordance with aspects of the subject matter described herein. At block 605, the actions begin.

At block 610, a request is received for metadata and/or searchable text of a file. For example, referring to FIG. 3, the cloud storage system 315 may, from the client 305, receive a request for metadata and/or searchable text for a placeholder stored on the client 305.

At block 615, the metadata and/or searchable text is provided. For example, referring to FIG. 3, the cloud storage system 315 may provide the requested metadata and/or searchable text to the client 305.

At block 620, other actions may occur. Other actions may include, for example, obtaining the metadata from intrinsic or extrinsic metadata of the file. Other actions may also include, for example, obtaining searchable text from content of the file.

As can be seen from the foregoing detailed description, aspects have been described related to file system placeholders. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
receiving metadata for a file system object that is represented by a placeholder, the placeholder being stored on a local file system of a client, the placeholder including data that identifies a remote storage system from which content of the file system object is obtainable, the client structured to synchronize the local file system, including the placeholders, with the remote storage system, the metadata sufficient to allow the client, while offline with respect to the remote storage system, to obtain namespace information about the file system object from the placeholder;
storing the metadata in the placeholder, the metadata comprising search metadata comprised of a sub-portion of the content of the file system object, the sub-portion comprising less than all of the content;
responding to a search request to search the file system by searching the search metadata of the file system object; and
further responding to the search by searching metadata from local file system objects that are stored on the local file system, wherein the searched metadata includes metadata from local file system objects that are not configured to be synchronized with the remote storage system including when the client is online with respect to the remote storage system.

2. The method of claim 1, further comprising, while the client is offline with respect to the remote storage system, performing actions, the actions comprising searching the metadata of the file system object from the placeholder.

3. The method of claim 1, further comprising:
representing a second file system object of the local file system with a second placeholder, the second file system object having content stored on the remote storage system and the local file system;
in association with deleting the content of the second file system object stored on the local file system, retaining the second metadata search database search data obtained from the second file system object; and
performing the search by searching the second metadata to determine that the second file system object that is represented by the second placeholder is relevant to the search request.

4. The method of claim 1, wherein:
the search metadata of the file system object comprises searchable text corresponding to content of the file system object.

5. The method of claim 4, wherein the search metadata of the file system object searchable text corresponding to content of the file system object.

6. The method of claim 5, wherein the file system object comprises a document and the searchable text comprises keywords derived from the text content of the document.

7. The method of claim 5, wherein the keywords were derived by a device that sent the keywords to the client.

8. The method of claim 1, further comprising, responsive to receiving a request for the content of the file system object:
obtaining the content of the file system object from the remote storage system; and
deleting the placeholder based on receipt of the content.

9. The method of claim 1, wherein the file system comprises a searchable database comprised of keywords extracted from the file system objects and the placeholders, the method further comprising, while the client is offline with respect to a plurality of remote storage systems, performing actions, the actions comprising:
performing the search by searching the search database;
finding, in the search database, an indication of a plurality of relevant file system objects according to the keywords in the searchable database, at least one of the relevant file system objects residing on the local file system and at least two of the relevant file system objects residing on different ones of the remote storage systems; and
displaying an indication of each of the relevant file system objects together in a single graphical interface.

10. The method of claim 1, wherein the search request comprises a search condition, the method further comprising:
obtaining data that indicates all file system objects of the local file system that satisfy the search condition, the all file system objects including a first set of file system objects and a second set of file system objects, the first set of file system objects residing on the local file system, the second set of file system objects residing on the remote storage system and represented by placeholders that are stored on the local file system; and
providing the data for both the first set of file system objects and the second set of file system objects in a single result set.

11. A method according to claim 10, wherein the search condition comprises a text condition of file system objects to be searched for, and wherein the placeholders include searchable text that comes from content of the second set of file system objects.

12. A computing device comprising:
storage hardware storing a file system and a file system manager configured to manage the file system;
the file system comprising file system objects comprising local files and placeholders representing respective remote files on a remote storage system accessible to the computing device via a network, each remote file comprising file content and file metadata, each placeholder configured to store file content and file metadata that includes search metadata, wherein the file system manager is configured to synchronize each placeholder's file content and file metadata with the file content and the file metadata of its respective remote file when the remote storage system is online with respect to the computing device, wherein the file system manager is not configured to synchronize the local files with the remote storage system is online with respect to the computing device, wherein the file system manager is further configured to manage a namespace of the file system that identifies the placeholders and the local files, wherein each placeholder is identified in the namespace regardless of how much how much corresponding file content is stored therein, and wherein the search metadata in a placeholder comprises text derived from corresponding file content;

the file system manager configured to perform the synchronizing while operatively coupled with the remote storage system via the network; and the file system manager configured to perform searches of the file system while not operatively coupled with the remote storage system by, for a given search, searching the local files and the search metadata of the placeholders.

13. The computing device according to claim 12, wherein the file content of a remote file comprises a document comprised of formatting content and text content, and wherein the search metadata in a placeholder representing the remote file comprises a subset of the text content without the formatting content.

14. The computing device of claim 13, wherein the text comprises text content extracted from the corresponding file content and wherein the corresponding file content is not stored on the local system.

15. The computing device of claim 12, wherein the file system further comprises a search database, the search metadata in the placeholders is stored in the search database, and a search of the file system is performed by searching the search database.

16. A computing device comprising:
processing hardware;
storage hardware storing a file system and a client configured to, when executed by the processing hardware, manage the file system;
the file system comprising file system objects comprising local files and placeholders representing respective remote files on a remote storage system accessible to the computing device via a network, each local file and remote file comprising respective file content and file metadata, each placeholder structured to store file content, file metadata, and search metadata, wherein the client is configured to synchronize each placeholder's file content and file metadata with the file content and the file metadata of its respective remote file, wherein the local files are local-only files and the client is not configured to synchronize the local files with the remote storage system, wherein the client is further configured to manage a namespace of the file system that identifies the placeholders and the local files, wherein each placeholder is identified in the namespace regardless of how much how much corresponding file content is stored therein, and wherein the search metadata in a placeholder comprises text derived from corresponding file content;

the file client configured to perform the synchronizing via the network with the remote storage system; and the client configured to perform searches of the file system while the computing device is unable to communicate via the network with the remote file system, wherein the client is configured to perform a file search by, while the computing device is unable to communicate via the network with the remote file system, searching file metadata in the local files and placeholders and by searching metadata in the placeholders.

17. A computing device according claim 16, wherein a placeholder represents a remote file whose file content comprises an image.

18. A computing device according to claim 16, wherein the client is configured to search one or more of the placeholders that store less than all of the file content of their respective remote files.

19. A computing device according to claim 16, wherein the client is configured to store, in a database of the file system, the search metadata of a plurality of the placeholders and search metadata of a plurality of the local files, and the client is further configured to perform a search of the file system using the database.

20. A computing device according to claim 16, wherein the client is configured receive the search metadata stored in the placeholders from the remote file system.

* * * * *